United States Patent
Brooks

(10) Patent No.: US 12,122,350 B2
(45) Date of Patent: Oct. 22, 2024

(54) SYSTEM AND METHOD FOR PURGING AGRICULTURAL SPRAYER NOZZLES USING AIR PRESSURE DATA

(71) Applicant: CNH Industrial America LLC, New Holland, PA (US)

(72) Inventor: Nathan Paul Brooks, Manitowoc, WI (US)

(73) Assignee: CNH Industrial America LLC, New Holland, PA (US)

( * ) Notice: Subject to any disclaimer, the term of this patent is extended or adjusted under 35 U.S.C. 154(b) by 758 days.

(21) Appl. No.: 17/225,525

(22) Filed: Apr. 8, 2021

(65) Prior Publication Data

US 2022/0264862 A1 Aug. 25, 2022

Related U.S. Application Data

(60) Provisional application No. 63/151,921, filed on Feb. 22, 2021.

(51) Int. Cl.
*A01M 7/00* (2006.01)
*A01B 59/00* (2006.01)
(Continued)

(52) U.S. Cl.
CPC ......... *B60W 10/103* (2013.01); *A01B 59/002* (2013.01); *A01C 23/007* (2013.01);
(Continued)

(58) Field of Classification Search
CPC .............. A01M 7/0042; A01M 7/0085; A01M 7/0089; A01C 23/007; A01C 23/008; B05B 12/085
See application file for complete search history.

(56) References Cited

U.S. PATENT DOCUMENTS 4,553,702 A 11/1985 Coffee et al.
4,813,604 A 3/1989 Curran, Jr.
(Continued)

FOREIGN PATENT DOCUMENTS

| FR | 2529807 | 1/1984 |
|---|---|---|
| WO | WO 2001/95714 | 12/2001 |
| WO | WO 2014/060733 | 4/2014 |

OTHER PUBLICATIONS

Barnes, Jeff, "Boom Air Purge", Greenway Equipment—YouTube, dated Feb. 12, 2018, (1 page) (00:02:28 video length) https://www.youtube.com/watch?v=7OwsmBgU7nc.

(Continued)

*Primary Examiner* — Tuongminh N Pham
(74) *Attorney, Agent, or Firm* — Rebecca Henkel; Peter K. Zacharias; Rickard K. DeMille

(57) ABSTRACT

An agricultural sprayer includes a purge tank, a nozzle configured to dispense an agricultural fluid onto an underlying field, and a downstream valve configured to selectively permit the air from the main fluid conduit to flow to the nozzle. A computing system is configured to initiate a purging operation to purge the agricultural fluid present within the nozzle and, upon receipt of the input, control an operation of a main valve such that the main valve is moved to an opened position to allow the air to flow through a main fluid conduit. In addition, the computing system is configured to monitor a first air pressure associated with the purge tank and a second air pressure associated with the nozzle. Furthermore, the computing system is configured to control an operation of the downstream valve during the purging operation based on the monitored first and second air pressures.

14 Claims, 4 Drawing Sheets

(51) Int. Cl.

| | | |
|---|---|---|
| A01C 23/00 | (2006.01) | |
| A01C 23/04 | (2006.01) | |
| A01D 41/127 | (2006.01) | |
| A01D 69/00 | (2006.01) | |
| B05B 1/20 | (2006.01) | |
| B05B 12/02 | (2006.01) | |
| B05B 12/08 | (2006.01) | |
| B05B 12/14 | (2006.01) | |
| B05B 12/16 | (2018.01) | |
| B05B 15/55 | (2018.01) | |
| B05B 15/65 | (2018.01) | |
| B08B 3/02 | (2006.01) | |
| B08B 5/02 | (2006.01) | |
| B60W 10/06 | (2006.01) | |
| B60W 10/103 | (2012.01) | |
| B60W 10/18 | (2012.01) | |
| B60W 30/18 | (2012.01) | |
| B60W 40/076 | (2012.01) | |
| B67D 7/02 | (2010.01) | |
| B67D 7/36 | (2010.01) | |
| B67D 7/38 | (2010.01) | |
| B67D 7/78 | (2010.01) | |
| B67D 99/00 | (2010.01) | |
| E02F 3/46 | (2006.01) | |
| E02F 9/22 | (2006.01) | |
| F16L 3/22 | (2006.01) | |
| G01M 3/32 | (2006.01) | |
| G05D 1/00 | (2006.01) | |
| G05D 1/223 | (2024.01) | |
| G07C 5/00 | (2006.01) | |
| G07C 5/08 | (2006.01) | |
| B05B 14/00 | (2018.01) | |
| G01F 23/70 | (2006.01) | |

(52) U.S. Cl.
CPC .......... *A01C 23/008* (2013.01); *A01C 23/047* (2013.01); *A01D 41/1274* (2013.01); *A01D 69/00* (2013.01); *A01M 7/0042* (2013.01); *A01M 7/0057* (2013.01); *A01M 7/0085* (2013.01); *A01M 7/0089* (2013.01); *B05B 1/20* (2013.01); *B05B 12/02* (2013.01); *B05B 12/081* (2013.01); *B05B 12/085* (2013.01); *B05B 12/14* (2013.01); *B05B 12/16* (2018.02); *B05B 15/55* (2018.02); *B05B 15/65* (2018.02); *B08B 3/02* (2013.01); *B08B 5/02* (2013.01); *B60W 10/06* (2013.01); *B60W 10/18* (2013.01); *B60W 10/182* (2013.01); *B60W 30/18118* (2013.01); *B60W 40/076* (2013.01); *B67D 7/02* (2013.01); *B67D 7/0294* (2013.01); *B67D 7/36* (2013.01); *B67D 7/362* (2013.01); *B67D 7/38* (2013.01); *B67D 7/78* (2013.01); *B67D 99/00* (2013.01); *E02F 3/46* (2013.01); *E02F 9/2271* (2013.01); *E02F 9/2275* (2013.01); *F16L 3/221* (2013.01); *G01M 3/3245* (2013.01); *G05D 1/0016* (2013.01); *G05D 1/223* (2024.01); *G07C 5/008* (2013.01); *G07C 5/08* (2013.01); *A01M 7/0082* (2013.01); *B05B 14/00* (2018.02); *B08B 2203/0205* (2013.01); *B60W 2520/10* (2013.01); *B60W 2552/15* (2020.02); *B60W 2720/10* (2013.01); *G01F 23/70* (2013.01)

(56) References Cited

U.S. PATENT DOCUMENTS

| | | | |
|---|---|---|---|
| 5,934,561 | A | 8/1999 | Knight |
| 7,303,145 | B2 | 12/2007 | Wysong |
| 9,554,506 | B2 | 1/2017 | Bittner et al. |
| 10,334,776 | B2 | 7/2019 | Bouten et al. |
| 10,369,585 | B2 | 8/2019 | Brooks et al. |
| 2010/0200668 | A1* | 8/2010 | Hahn .................. A01C 23/007 239/1 |
| 2017/0072420 | A1 | 3/2017 | Meyer |
| 2018/0369851 | A1 | 12/2018 | Engelbrecht et al. |
| 2020/0390079 | A1 | 12/2020 | Brooks et al. |

OTHER PUBLICATIONS

"How To Do a Boom Air Purge", Martin Deerline Product Support—YouTube, dated Apr. 27, 2020, (1 page) (00:04:02 video length) https://www.youtube.com/watch?v=05qPIalSccM.

* cited by examiner

SYSTEM AND METHOD FOR PURGING AGRICULTURAL SPRAYER NOZZLES USING AIR PRESSURE DATA

CROSS-REFERENCE TO RELATED APPLICATIONS

This application is based upon and claims the right of priority to U.S. Provisional Patent Application No. 63/151,921, filed on Feb. 22, 2021, the disclosure of which is hereby incorporated by reference herein in its entirety for all purposes.

FIELD OF THE INVENTION

The present disclosure generally relates to agricultural sprayers and, more particularly, to systems and methods for purging nozzles of an agricultural sprayer using captured air pressure data.

BACKGROUND OF THE INVENTION

Agricultural sprayers apply an agricultural fluid (e.g., a pesticide, a nutrient, and/or the like) onto crops as the sprayer is traveling across a field. To facilitate such travel, sprayers are configured as self-propelled vehicles or implements towed behind an agricultural tractor or other suitable work vehicle. A typical sprayer includes a boom assembly on which a plurality of spaced apart nozzles is mounted. Each nozzle is configured to dispense or otherwise spray the agricultural fluid onto underlying crops and/or field surface.

In general, it is desirable to purge the agricultural fluid from the fluid components (e.g., the nozzles, fluid conduits, valves, etc.) of the sprayer upon completion of a spraying operation. In this respect, after the spraying operation is finished, pressurized air may be forced through the fluid components to purge agricultural fluid remaining therein. Purging prevents the residual agricultural fluid from the sprayer operation from freezing and/or congealing with the fluid components. As such, systems for purging the remaining agricultural fluid from the fluid components of a sprayer have been developed. However, further improvements are needed.

Accordingly, an improved system and method for purging nozzles of an agricultural sprayer would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to an agricultural sprayer. The agricultural sprayer includes a purge tank, a main fluid conduit fluidly coupled to the purge tank, and a main valve configured to selectively permit air from the purge tank to flow through the main fluid conduit. Furthermore, the agricultural sprayer includes a boom assembly and a nozzle supported on the boom assembly, with the nozzle configured to dispense an agricultural fluid onto an underlying field. Additionally, the agricultural sprayer includes a downstream fluid conduit fluidly coupled to the nozzle, a downstream valve fluidly coupled between the main fluid conduit and the downstream fluid conduit, and the downstream valve configured to selectively permit the air from the main fluid conduit to flow to the nozzle. Moreover, the agricultural sprayer includes a first pressure sensor configured to capture data indicative of a first air pressure associated with the purge tank, a second pressure sensor configured to capture data indicative of a second air pressure associated with the nozzle, and a computing system communicatively coupled to the first and second pressure sensors. The computing system is, in turn, configured to initiate a purging operation to purge the agricultural fluid present within the nozzle and, upon receipt of the input, control an operation of the main valve such that the main valve is moved to an opened position to allow the air to flow through the main fluid conduit. In addition, the computing system is configured to monitor the first air pressure associated with the purge tank based on the data captured by the first pressure sensor and monitor the second air pressure associated with the nozzle based on the data captured by the second pressure sensor. Furthermore, the computing system is configured to control an operation of the downstream valve during the purging operation based on the monitored first and second air pressures.

In another aspect, the present subject matter is directed to a system for purging nozzles of an agricultural sprayer. The system includes a pressurized air source, a main fluid conduit fluidly coupled to the pressurized air source, and a main valve configured to selectively permit air from the pressurized air source to flow through the main fluid conduit. Furthermore, the system includes a nozzle configured to dispense an agricultural fluid onto an underlying field, a downstream fluid conduit fluidly coupled to the nozzle, a downstream valve fluidly coupled between the main fluid conduit and the downstream fluid conduit, with the downstream valve configured to selectively permit air from the main fluid conduit to flow to the nozzle. Additionally, the system includes a first pressure sensor configured to capture data indicative of a first air pressure associated with the pressurized air source, a second pressure sensor configured to capture data indicative of a second air pressure associated with the nozzle, and a computing system communicatively coupled to the first and second pressure sensors. The computing system is, in turn, configured to receive an input indicative of initiation of a purging operation to purge the agricultural fluid present within the nozzle and, upon receipt of the input, control an operation of the main valve such that the main valve is moved to an opened position to allow the air to flow through the main fluid conduit. Moreover, the computing system is configured to monitor the first air pressure associated with the pressurized air source based on the data captured by the first pressure sensor and monitor the second air pressure associated with based on the data captured by the second pressure sensor. In addition, the computing system is configured to control an operation of the downstream valve during the purging operation based on the monitored first and second air pressures.

In a further aspect, the present subject matter is directed to a method for purging nozzles of an agricultural sprayer. The agricultural sprayer, in turn, includes a pressurized air source, a main valve configured to selectively permit air from the pressurized air source to flow through a main fluid conduit, and a nozzle configured to dispense an agricultural fluid onto an underlying field. Furthermore, the agricultural sprayer includes a downstream valve configured to selectively permit air from the main fluid conduit to flow to the nozzle. The method includes receiving, with a computing system, an input indicative of initiation of a purging operation to purge the agricultural fluid present within the nozzle. Upon receipt of the input, the method includes controlling, with the computing system, an operation of the main valve such that the main valve is moved to an opened position to allow the air to flow through the main fluid conduit. Additionally, the method includes receiving, with the computing system, first pressure sensor data indicative of a first air pressure associated with the pressurized air source. In addition, the method includes monitoring, with the computing system, the first air pressure associated with the pressurized air source based on the received first pressure sensor data. Furthermore, the method includes receiving, with the computing system, second pressure sensor data indicative of a second air pressure associated with the nozzle. Additionally, the method includes monitoring, with the computing system, the second air pressure associated with based on the received second pressure sensor data. Moreover, the method includes controlling, with the computing system, an operation of the downstream valve during the purging operation based on the monitored first and second air pressures.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
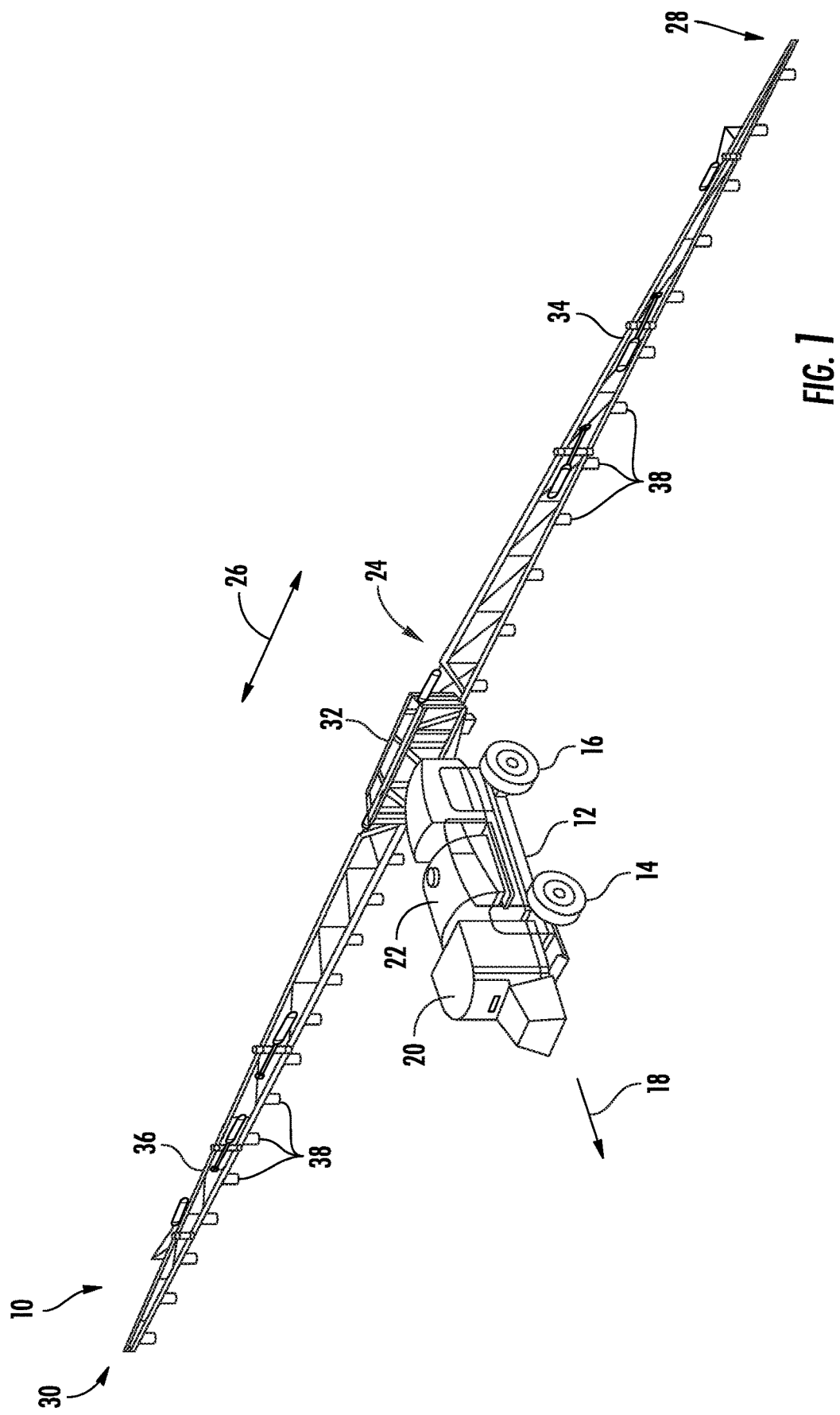
FIG. 1 illustrates a perspective view of one embodiment of an agricultural sprayer in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and a method for purging nozzles of an agricultural sprayer. As will be described below, the sprayer may include a pressurized air source (e.g., a pump and/or a purge tank), a main fluid conduit fluidly coupled to the pressurized air source, and a main valve (e.g., a purge valve) configured to selectively permit air from the pressurized air source to flow through the main fluid conduit. Furthermore, system may include a nozzle configured to dispense an agricultural fluid onto an underlying field and a downstream fluid conduit fluidly coupled to the nozzle. Additionally, the system may include a downstream valve fluidly coupled between the main fluid conduit and the downstream fluid conduit, with the downstream valve configured to selectively permit air from the main fluid conduit to flow to the nozzle.

In several embodiments, a computing system may be configured to control the operation of the downstream valve to purge the remaining agricultural fluid present within the nozzle. More specifically, after completion of a spraying operation, the computing system may receive an input (e.g., from the operator) indicative of initiation of a purging operation. Upon receipt of the input, the computing system may control the operation of the main valve such that the main valve is moved to an opened position, thereby allowing air from the pressurized air source to flow through the main fluid conduit. Furthermore, after the main valve is opened, the computing system may monitor a first air pressure associated with the pressurized air source based on data received from a first pressure sensor. Additionally, the computing system may monitor a second air pressure associated with the nozzle based on data received from a second pressure sensor. Moreover, the computing system is configured to control the operation of the downstream valve during the purging operation based on the monitored first and second air pressures.

Controlling the operation of the downstream valve based on the air pressure data received from the monitored first and second air pressures during a purging operation improves the effectiveness and efficiency of the purging operation. For example, as will be described below, the use of the monitored air pressures may allow the computing system to determine when purging of a nozzle (or a section of nozzles) is complete. Conventional purging systems control the duration of a purging operation based on a predetermined time period. However, the predetermined time period may elapse before or after the nozzle(s) has been fully purged. When the predetermined time period elapses before the nozzle(s) has been fully purged, agricultural fluid may remain within the nozzle(s), which can freeze or congeal. In addition, when the predetermined time period elapses after the nozzle(s) has been fully purged, purging air may be wasted and the purging process may take longer than is necessary. Thus, by using the monitored air pressures, purging air can be supplied to a nozzle (or section of nozzles) across a duration that sufficiently removes the residual agricultural fluid without wasting purging air.

Referring now to the drawings, FIG. 1 illustrates a perspective view of one embodiment of an agricultural sprayer 10. In the illustrated embodiment, the agricultural sprayer 10 is configured as a self-propelled agricultural sprayer. However, in alternative embodiments, the agricultural sprayer 10 may be configured as any other suitable agricultural vehicle that dispenses an agricultural fluid (e.g., a pesticide or a nutrient) while traveling across a field, such as an agricultural tractor and an associated implement (e.g., a towable sprayer, an inter-seeder, a side-dresser, and/or the like).

As shown in FIG. 1, the agricultural sprayer 10 includes a frame or chassis 12 configured to support or couple to a plurality of components. For example, a pair of steerable front wheels 14 and a pair of driven rear wheels 16 may be coupled to the frame 12. The wheels 14, 16 may be configured to support the agricultural sprayer 10 relative to the ground and move the sprayer 10 in a direction of travel (indicated by arrow 18) across the field. Furthermore, the frame 12 may support a cab 20 and an agricultural fluid tank 22 configured to store or hold an agricultural fluid, such as a pesticide (e.g., a herbicide, an insecticide, a rodenticide, and/or the like), a fertilizer, or a nutrient. However, in alternative embodiments, the sprayer 10 may have any other suitable configuration. For example, in one embodiment, the front wheels 14 of the sprayer 10 may be driven in addition to or in lieu of the rear wheels 16.

Additionally, the sprayer 10 may include a boom assembly 24 mounted on the frame 12. In general, the boom assembly 24 may extend in a lateral direction (indicated by arrow 26) between a first lateral end 28 and a second lateral end 30, with the lateral direction 26 being perpendicular to the direction of travel 18. In one embodiment, the boom assembly 24 may include a center section 32 and a pair of wing sections 34, 36. As shown in FIG. 1, a first wing section 34 extends outwardly in the lateral direction 26 from the center section 32 to the first lateral end 28. Similarly, a second wing section 36 extends outwardly in the lateral direction 26 from the center section 32 to the second lateral end 30. Furthermore, a plurality of nozzles 38 (FIG. 2) may be supported on the boom assembly 24. Each nozzle 38 may, in turn, be configured to dispense the agricultural fluid stored in the tank 22 onto the underlying field. However, in alternative embodiments, the boom assembly 24 may have any other suitable configuration.

It should be further appreciated that the configuration of the agricultural sprayer 10 described above and shown in FIG. 1 is provided only to place the present subject matter in an exemplary field of use. Thus, it should be appreciated that the present subject matter may be readily adaptable to any manner of agricultural sprayer configuration.

Figure 2:
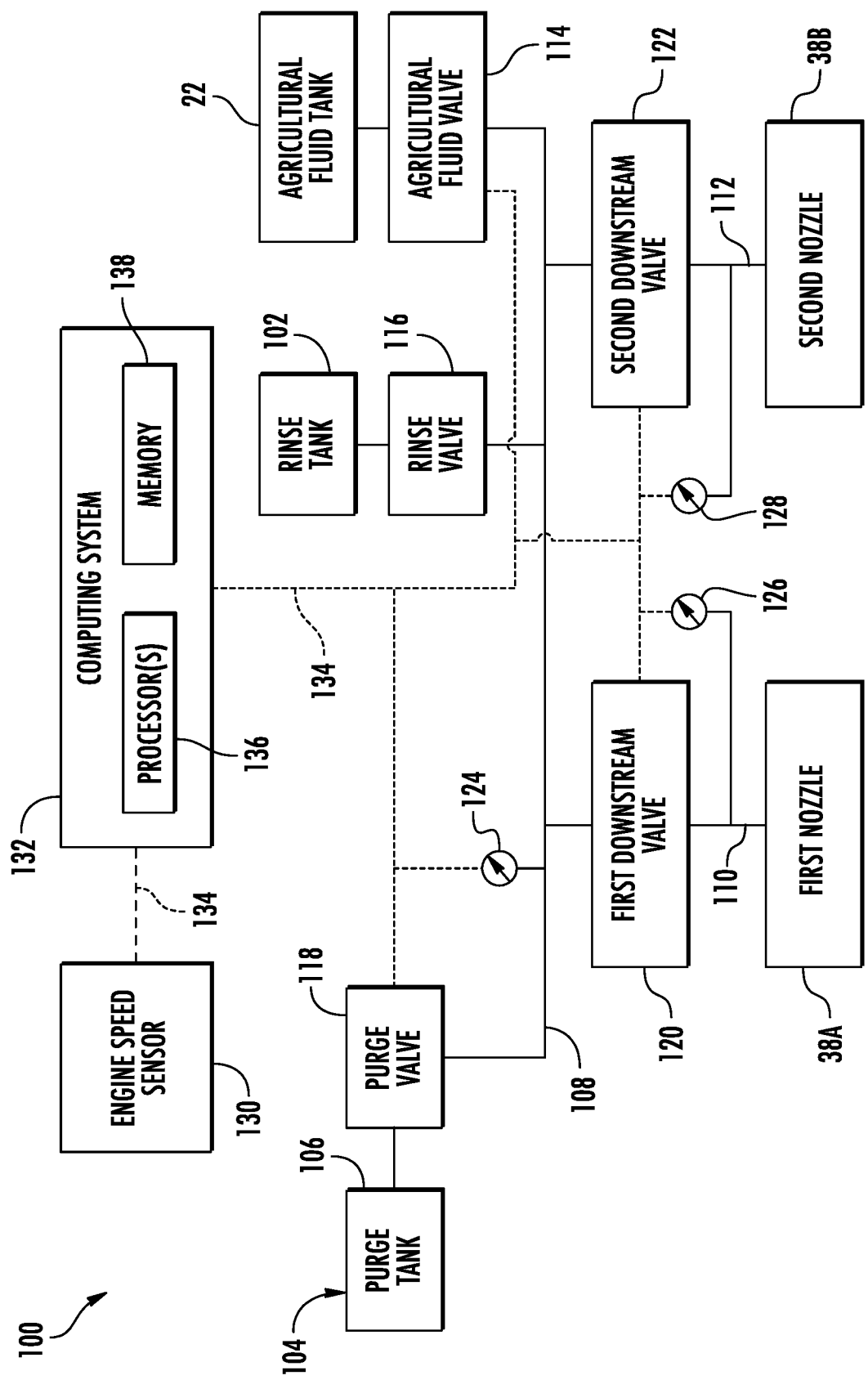
FIG. 2 illustrates a schematic view of one embodiment of a system for purging nozzles of an agricultural sprayer in accordance with aspects of the present subject matter.

Referring now to FIG. 2, a schematic view of one embodiment of a system 100 for purging nozzles of an agricultural sprayer is illustrated in accordance with aspects of the present subject matter. In general, the system 100 will be described herein with reference to the agricultural sprayer 10 described above with reference to FIG. 1. However, it should be appreciated by those of ordinary skill in the art that the disclosed system 100 may generally be utilized with agricultural sprayers having any other suitable sprayer configuration.

In several embodiments, the system 100 may include a plurality of the nozzles of the sprayer 10. In general, and as described above, the nozzles may be configured to dispense the agricultural fluid stored within the agricultural fluid tank 22 onto the underlying field. For example, as shown in FIG. 2, in the illustrated embodiment, the system 100 includes a first nozzle 38A and a second nozzle 38B. However, in alternative embodiments, the system 100 may have any other suitable number of nozzles. For example, in some embodiments, the system 100 may include fifty or more nozzles.

As shown in FIG. 2, the system 100 also includes one or more tanks of the agricultural sprayer 10. In general, the tanks may store various fluid for use during and/or after the performance of a spraying operation. For example, in the illustrated embodiment, the system 100 includes the agricultural fluid tank 22. As mentioned above, the tank 22 may be configured to store an agricultural fluid (e.g., a pesticide) to be applied to a field via the nozzles 38A, 38B. Additionally, in the illustrated embodiment, the system 100 includes a rinse tank 102. In general, the rinse tank 102 may be configured to store a liquid (e.g., water) that may be used to rinse the nozzles 38A, 38B (and the associated fluid conduits) after completion of a spraying operation and a subsequent purging operation.

Moreover, in several embodiments, the system 100 may include a pressurized air source 104 of the agricultural sprayer 10. In general, the pressurized air source 104 may be configured to supply pressurized air to the purge agricultural fluid remaining within the nozzles 38A, 38B (and the associated fluid conduits) after completion of a spraying operation a before the rinsing operation. For example, in the illustrated embodiment, the pressurized air source 104 is configured as a purge tank 106 configured to store pressurized air. As will be described below, pressurized air from the purge tank 106 may be released to purge the nozzles 38A, 38B (and the associated fluid conduits). In this respect, the system 100 may include a compressor (not shown) to supply pressurized air to the purge tank 106. In alternative embodiments, the pressurized air source 104 may correspond to a compressor that supplies pressurized air directly to the nozzles 38A, 38B (without an intervening tank) during a purging operation.

Furthermore, the system 100 may include various fluid conduits of the agricultural sprayer 10. For example, in several embodiments, the system 100 may include a main fluid conduit 108 that is fluidly coupled to the agricultural fluid tank 22, the rinse tank 102, and the purge tank 106. Additionally, in several embodiments, the system 100 may include first and second downstream fluid conduits 110, 112. Specifically, the first downstream fluid conduit 110 may be fluidly coupled between the main fluid conduit 108 and the first nozzle 38A. Moreover, the second downstream fluid conduit 112 may be fluidly coupled between the main fluid conduit 108 and the second nozzle 38B. Thus, agricultural fluid from the agricultural fluid tank 22, the liquid from the rinse tank 102, and/or the pressurized air from the purge tank 106 may be supplied to the nozzles 38A, 38B via the main fluid conduit 108 and the first and second downstream fluid conduits 110, 112. Further, in some embodiments, a pump (not shown) may be fluidly coupled to the main fluid conduit 108 to supply the agricultural fluid from the agricultural fluid tank 22 and/or liquid from the rinse tank 102 to the nozzles 38A, 38B.

Additionally, the system 100 may include one or more valves configured to control the flow of the agricultural fluid, liquid, and/or pressurized air into the main fluid conduit 108. For example, in several embodiments, the system 100 may include an agricultural fluid valve 114, a rinse valve 116, and a purge valve 118. Specifically, the agricultural fluid valve 114 may be configured to selectively permit agricultural fluid from the agricultural fluid tank 22 to flow through the main fluid conduit 108. In this respect, the agricultural fluid valve 114 may be configured to prevent liquid from the rinse tank 102 and pressurized air from the purge tank 106 from flowing into the agricultural fluid tank 22 during rinsing and purging operations, respectively. Moreover, the rinse valve 116 may be configured to selectively permit liquid from the rinse tank 102 to flow through the main fluid conduit 108. In this respect, the rinse valve 116 may be configured to prevent agricultural fluid from the agricultural fluid tank 22 and pressurized air from the purge tank 106 from flowing into the agricultural fluid tank 22 during spraying and purging operations, respectively. Furthermore, the purge valve 118 may be configured to selectively permit liquid from the purge tank 106 to flow through the main fluid conduit 108. In this respect, the purge valve 118 may be configured to prevent agricultural fluid from the agricultural fluid tank 22 and liquid from the rinse tank 102 from flowing into the agricultural fluid tank 22 during spraying and rinsing operations, respectively.

Moreover, the system 100 may include first and second downstream valves 120, 122. Specifically, in several embodiments, the first downstream valve 120 may be coupled between the main fluid conduit 108 and the first downstream fluid conduit 110. In this respect, the first downstream valve 120 may be configured to selectively permit the agricultural fluid, liquid, and/or pressurized air from the main fluid conduit 108 to flow to the first nozzle 38A. Furthermore, in several embodiments, the second downstream valve 122 may be coupled between the main fluid conduit 108 and the second downstream fluid conduit 112. As such, the second downstream valve 122 may be configured to selectively permit the agricultural fluid, liquid, and/or pressurized air from the main fluid conduit 108 to flow to the second nozzle 38B. However, in alternative embodiments, the system 100 may include any other suitable number of valves controlling the flow of the agricultural fluid, liquid, and/or pressurized air to the nozzles.

The system 100 illustrated in FIG. 2 includes two nozzles 38A, 38B and two downstream valves 120, 122 for controlling the flow of the agricultural fluid, liquid, and/or pressurized air from the main fluid conduit 108 to the nozzles 38A, 38B. Specifically, in the illustrated embodiment, each downstream valve 122, 124 selectively controls the flow of the agricultural fluid, liquid, and/or pressurized air from the main fluid conduit 108 to a single nozzle. Thus, in the illustrated embodiment, the flow of the agricultural fluid, rinsing liquid, and pressurized purging air can be controlled on a nozzle-by-nozzle basis. However, in alternative embodiments, each valve 122, 124 may selectively control the flow of the agricultural fluid, liquid, and/or pressurized purging air from the main fluid conduit 108 to a group of nozzles. Thus, in such embodiments, the flow of the dispensing of the agricultural fluid, rinsing liquid, and pressurized purging air can be controlled based on groupings of nozzles.

Additionally, the system 100 may include a first pressure sensor 124. In general, the first pressure sensor 124 may be configured to capture data indicative of the air pressure associated with the pressurized air source 104. For example, in the illustrated embodiment, the first pressure sensor 124 is in operative association with the main fluid conduit 108. In such an embodiment, the first pressure sensor 124 is configured to capture data indicative of the pressure of the pressurized air present within the main fluid conduit 108 during a purging operation. In the illustrated embodiment, the first pressure sensor 124 may also be configured to capture data indicative of the pressure of the agricultural fluid and/or the rinse liquid present within the main fluid conduit 108 during a spraying or rinsing operation, respectively. Alternatively, the first pressure sensor 124 may be positioned at any other suitable location within the system 100 that permits the first pressure sensor 124 to capture data indicative of the pressure of the pressurized air associated with the pressurized air source 104. For example, in one embodiment, the first pressure sensor 124 may be in operative association with the purge tank 106.

Furthermore, the system 100 may include second and third pressure sensors 126, 128. In general, the second and third pressure sensors 126, 128 may be configured to capture data indicative of the pressure of the pressurized air associated with the first and second nozzles 38A, 38B, respectively. For example, in the illustrated embodiment, the second pressure sensor 126 is in operative association with the first downstream fluid conduit 110. In such an embodiment, the second pressure sensor 126 is configured to capture data indicative of the pressure of the pressurized air present within the first downstream fluid conduit 110 during a purging operation. Moreover, in the illustrated embodiment, the third pressure sensor 128 is in operative association with the second downstream fluid conduit 112. In such an embodiment, the third pressure sensor 128 is configured to capture data indicative of the pressure of the pressurized air present within the second downstream fluid conduit 112 during a purging operation. Alternatively, the second and third pressure sensors 126, 128 may be positioned at any other suitable locations within the system 100 that permits the second and third pressure sensors 126, 128 to capture data indicative of the pressure of the pressurized air associated with the first and second nozzles 38A, 38B. For example, in one embodiment, the second and third pressure sensors 126, 128 may be integrated into the first and second nozzles 38A, 38B, respectively.

The first, second, and third pressure sensors 124, 126, 128 may correspond to any suitable pressure-sensing devices. For example, the pressure sensors 124, 126, 128 may correspond to diaphragm pressure sensors, piston pressure sensors, strain gauge-based pressure sensors, electromagnetic pressure sensors, and/or the like. As will be described below, the data captured by the pressure sensors 124, 126, 128 may be used to control the operation of the first and second valves 122, 124 during purging operations.

Furthermore, in some embodiments, the system 100 may include an engine speed sensor 130. In general, the engine speed sensor 130 may be configured to capture data indicative of the engine speed of the agricultural sprayer 10. For example, in one embodiment, the engine speed of the sprayer 10 may correspond to the rotational speed of a crankshaft (not shown) of an engine (not shown) of the sprayer 10 or the agricultural vehicle (not shown) towing the sprayer 10. In this respect, the engine speed sensor 130 may correspond to any suitable sensing device, such as a crankshaft position sensor or other Hall Effect sensor. As will be described below, the data captured by the engine speed sensor 130 may be used to determine when a purging operation can be initiated.

In accordance with aspects of the present subject matter, the system 100 may include a computing system 132 communicatively coupled to one or more components of the agricultural sprayer 10 and/or the system 100 to allow the operation of such components to be electronically or automatically controlled by the computing system 132. For instance, the computing system 132 may be communicatively coupled to the pressure sensors 124, 126, 128 of the system 100 via a communicative link 134. As such, the computing system 132 may be configured to receive data from the sensors 124, 126, 128 that is indicative of the pressure of the pressurized air associated with the pressurized air source 104, the first nozzle 38A, and/or the second nozzle 38B, respectively. Additionally, the computing system 132 may be communicatively coupled to the engine speed sensor 130 of the system 100 via the communicative link 134. In this respect, the computing system 132 may be configured to receive data from the engine speed sensor 130 that is indicative of the engine speed of the sprayer 10. Moreover, the computing system 132 may be communicatively coupled to the various valves 114, 116, 118, 120, 122 of the sprayer 10 via the communicative link 134. In this respect, the computing system 132 may be configured to control the operation of such valves 114, 116, 118, 120, 122 in a manner that moves the valves between opened and closed positions to control the flow of the agricultural fluid, rinse liquid, and pressurized air to the nozzles 38A, 38B. Additionally, the computing system 132 may be communicatively coupled to any other suitable components of the sprayer 10 and/or the system 100.

In general, the computing system 132 may comprise one or more processor-based devices, such as a given controller or computing device or any suitable combination of controllers or computing devices. Thus, in several embodiments, the computing system 132 may include one or more processor(s) 136 and associated memory device(s) 138 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 138 of the computing system 132 may generally comprise memory element(s) including, but not limited to, a computer readable medium (e.g., random access memory (RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 138 may generally be configured to store suitable computer-readable instructions that, when implemented by the processor(s) 136, configure the computing system 132 to perform various computer-implemented functions, such as one or more aspects of the methods and algorithms that will be described herein. In addition, the computing system 132 may also include various other suitable components, such as a communications circuit or module, one or more input/output channels, a data/control bus and/or the like.

The various functions of the computing system 132 may be performed by a single processor-based device or may be distributed across any number of processor-based devices, in which instance such devices may be considered to form part of the computing system 132. For instance, the functions of the computing system 132 may be distributed across multiple application-specific controllers or computing devices, such as a navigation controller, an engine controller, a transmission controller, a spray controller, and/or the like.

Figure 3:
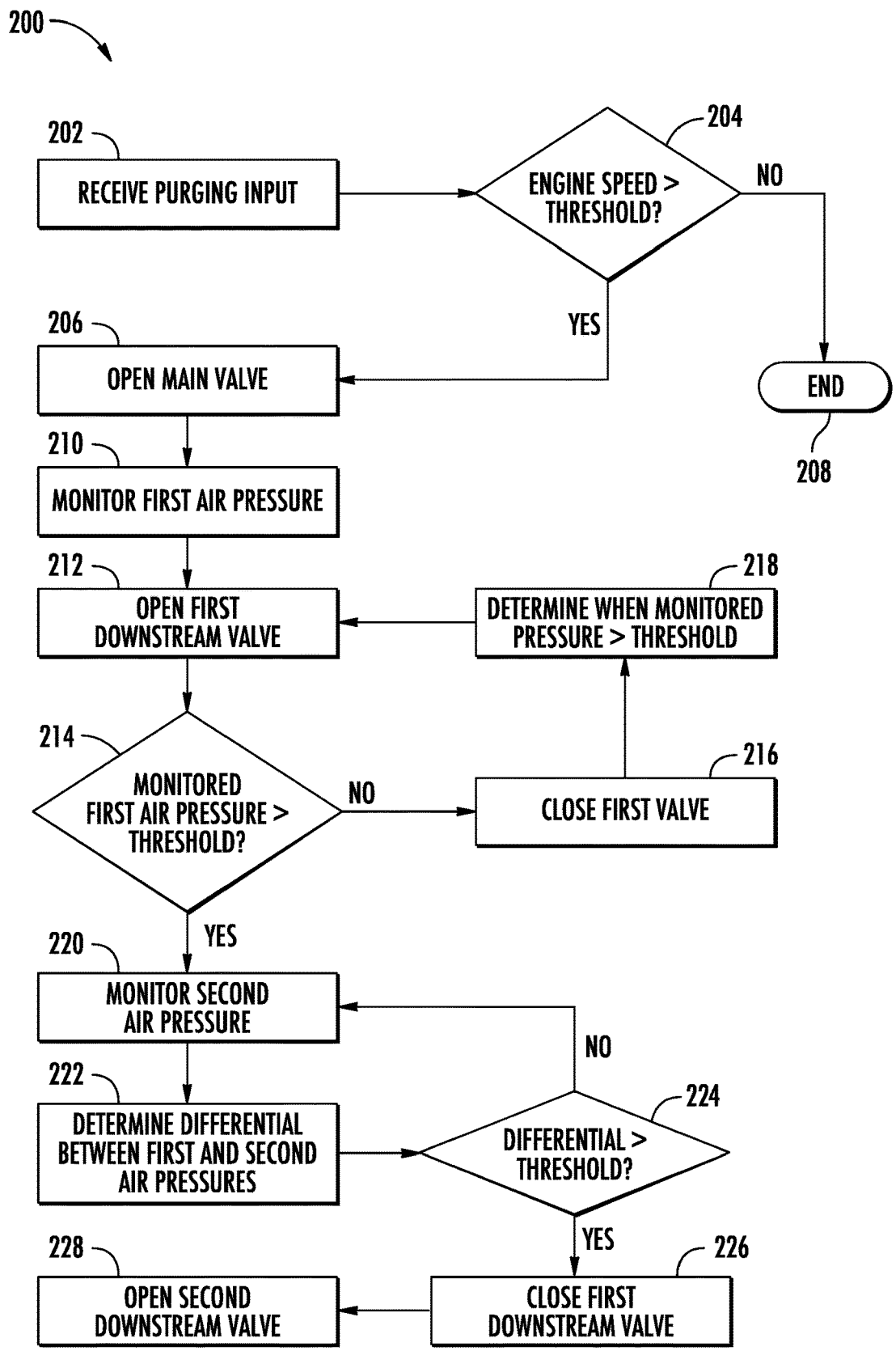
FIG. 3 illustrates a flow diagram providing one embodiment of example control logic for purging nozzles of an agricultural sprayer in accordance with aspects of the present subject matter.

Referring now to FIG. 3, a flow diagram of one embodiment of example control logic 200 that may be executed by the computing system 132 (or any other suitable computing system) for purging nozzles of an agricultural sprayer is illustrated in accordance with aspects of the present subject matter. Specifically, the control logic 200 shown in FIG. 3 is representative of steps of one embodiment of an algorithm that can be executed to purge the nozzles of an agricultural sprayer in a manner that improves the efficiency of the purging operation without sacrificing effectiveness. Thus, in several embodiments, the control logic 200 may be advantageously utilized in association with a system installed on or forming part of an agricultural sprayer to allow for real-time control of a purging operation without requiring substantial computing resources and/or processing time. However, in other embodiments, the control logic 200 may be used in association with any other suitable system, application, and/or the like for purging nozzles of an agricultural sprayer.

The control logic 200 will be described below in the context of purging the nozzles 38A, 38B, with such purging being controlled on a nozzle-by-nozzle basis. However, in alternative embodiments, the control logic 200 may be used to purge any other suitable number of nozzles 38 on the sprayer 10. Moreover, in some embodiments, the control logic 200 may be used to control the purging operation based on groupings of nozzles 38.

As shown in FIG. 3, at (202), the control logic 200 includes receiving an input indicative of initiation of a purging operation to purge the agricultural fluid present within the nozzles of an agricultural sprayer. For example, when the operator of the agricultural sprayer 10 would like to purge the nozzles 38A, 38B, he/she may provide an input indicative to this desire to a user interface (not shown) associated with the sprayer 10. The computing system 132 may, in turn, receive this input from the user interface (e.g., via the communicative link 134).

At (204), the control logic 200 includes comparing the engine speed associated with the agricultural sprayer to a minimum engine speed threshold. As mentioned above, in some embodiments, the computing system 132 may be communicatively coupled to the engine speed sensor 130 via the communicative link 134. In this respect, during operation of the sprayer 10, the computing system 132 may receive data from the engine speed sensor 130 that is indicative of the current engine speed of the sprayer 10 (or the work vehicle towing it). As such, the computing system 132 may be configured to determine the current engine speed associated with the sprayer 10 (or its towing vehicle) based on the received engine speed sensor data. For example, the computing system 132 may include a look-up table(s), suitable mathematical formula, and/or algorithms stored within its memory device(s) 138 that correlates the received sensor data to the engine speed. Thereafter, the computing system 132 may compare the determined engine speed to the minimum engine speed threshold. When the determined engine speed exceeds the minimum engine speed threshold, the engine speed may be suitable for powering the various components of the sprayer 10 during the purging operation. In such instances, the purging operation proceeds (e.g., to (206)). However, when the determined engine speed falls below the engine speed minimum threshold, the engine speed associated with the sprayer 10 may not be suitable for powering the various components of the sprayer 10 during the purging operation. In such instances, the computing system 132 halts the purging operation (e.g., at (208)).

Furthermore, at (206), the control logic 200 includes controlling the operation of a main valve of the agricultural sprayer such that the main valve is moved to an opened position to allow the air to flow through a main fluid conduit of the sprayer. Specifically, in several embodiments, after receipt of the purging input (e.g., at (202)) and comparison of the engine speed to the associated threshold (e.g., at (204)), the computing system 132 may control the operation of the purge valve 118 such that the purge valve 118 is moved to an opened position. For example, the computing system 132 may transmit control signals to the purge valve 118 via the communicative link 134 instructing the purge valve 118 to move to the opened position. Once the purge valve 118 is at the opened position, pressurized air from the purge tank 106 may flow into the main fluid conduit 108, thereby charging or otherwise pressurizing the conduit 108.

In addition, at (206), the computing system 132 may control the operation of the agricultural fluid valve 114 and the rinse valve 116 such that these valves 114, 114 are moved to the closed position. When at the closed position, the agricultural fluid valve 116 may prevent the pressurized air from the purge tank 106 from flowing to the agricultural fluid tank 22, while preventing the agricultural fluid within the agricultural fluid tank 22 from flowing to the nozzles

38A, 38B. Similarly, when at the closed position, the rinse valve 116 may prevent the pressurized air from the purge tank 106 from flowing to the rinse tank 102, while preventing the rinse liquid within the rinse tank 102 from flowing to the nozzles 38A, 38B.

Additionally, at (210), the control logic 200 includes monitoring a first air pressure associated with a pressurized air source of the agricultural sprayer. As mentioned above, the computing system 132 may be communicatively coupled to the first pressure sensor 124 via the communicative link 134. In this respect, after initiation of the purging operation, the computing system 132 may receive data from the first pressure sensor 124 that is indicative of the air pressure within the main fluid conduit 108. Thereafter, the computing system 132 may be configured to determine the first air pressure based on the received first pressure sensor data. For example, the computing system 132 may include a look-up table(s), suitable mathematical formula, and/or algorithms stored within its memory device(s) 138 that correlates the received sensor data to the first air pressure.

Moreover, at (212), the control logic 200 includes controlling the operation of a downstream valve of the agricultural sprayer such that the downstream valve is moved to an opened position to purge the agricultural fluid present within the nozzle. Specifically, in several embodiments, after initiation of the purging operation, the computing system 132 may control the operation of the first downstream valve 120 such that the first downstream valve 120 is moved to an opened position. For example, the computing system 132 may transmit control signals to the first downstream valve 120 via the communicative link 134 instructing the first downstream valve 120 to move to the opened position. Once the first downstream valve 120 is at the opened position, pressurized air from the main fluid conduit 108 may flow through the first downstream fluid conduit 110 and through the first nozzle 38A, thereby purging the agricultural fluid present within the first nozzle 38A.

As shown in FIG. 3, after moving the first valve to the opened position, the control logic 200 includes, at (214), comparing the monitored first air pressure associated with the pressurized air source to a minimum pressure value. For example, in several embodiments, after moving the first downstream valve 120 to the opened position, the computing system 132 is configured to compare the monitored first air pressure (e.g., the first air pressure monitored at (210)) to a minimum pressure value.

When the monitored first air pressure falls below the minimum pressure value, the control logic 200 includes, at (216), controlling the operation of the downstream valve such that the downstream valve is moved to a closed position to cease purging the agricultural fluid present within the nozzle. More specifically, when the monitored first air pressure falls below the minimum pressure value after opening the first downstream valve 120, there may be insufficient air pressure within the main fluid conduit 108 to support the purging operation. In such instances, the computing system 132 may control the operation of the first downstream valve 120 such that the first downstream valve 120 is moved to the closed position. For example, the computing system 132 may transmit control signals to the first downstream valve 120 via the communicative link 134 instructing the first downstream valve 120 to move to the closed position. Once the first downstream valve 120 is at its closed position, the air pressure within the main fluid conduit 108 may increase. In this respect, at (218), the computing system 132 may determine when the monitored first air pressure exceeds the minimum pressure threshold.

Once the monitored first air pressure exceeds the minimum pressure threshold, the computing system 132 may control the operation of the first downstream valve 120 such that the first downstream valve 120 is moved to the opened position again (e.g., at (212)).

Conversely, when the downstream valve is opened and the monitored first air pressure exceeds the minimum pressure threshold at (214), the control logic 200 includes, at (220), monitoring a second air pressure associated with the nozzle. As mentioned above, the computing system 132 may be communicatively coupled to the second pressure sensor 126 via the communicative link 134. In this respect, after the first valve is moved to the opened position, the computing system 132 may receive data from the second pressure sensor 126 that is indicative of the air pressure within the first downstream fluid conduit 110. Thereafter, the computing system 132 may be configured to determine the second air pressure based on the received second pressure sensor data. For example, the computing system 132 may include a look-up table(s), suitable mathematical formula, and/or algorithms stored within its memory device(s) 138 that correlates the received sensor data to the second air pressure. As will be described below, the monitored first and second air pressures may be used to control the operation of the first downstream valve 120 during the purging operation.

Furthermore, after moving the downstream valve to the opened position, the control logic 200 includes, at (222), determining a differential between the monitored first and second air pressures. For example, in several embodiments, the computing system 132 is configured to compare the determined first air pressure (e.g., the first air pressure determined at (210)) and the determined second air pressure (e.g., the second air pressure determined at (220)) to determine a differential therebetween.

As shown in FIG. 3, at (224), the control logic 200 may include comparing the determined differential to a differential threshold. For example, in several embodiments, the computing system 132 is configured to compare the determined differential between the monitored first and second air pressures (e.g., the differential determined at (222)) to a differential threshold. More specifically, residual agricultural fluid present within the first nozzle 38A may cause the second monitored air pressure (e.g., the air pressure within the first downstream fluid conduit 110) to be greater than when no residual agricultural fluid present. That is, the residual agricultural fluid reduces that rate at which the pressurized air from the purge tank 106 can flow through the first nozzle 38A, thereby increasing the air pressure within the first downstream fluid conduit 110. In this respect, when the determined differential falls below the differential threshold, residual agricultural fluid may still be present within the first nozzle 38A (and/or the first downstream fluid conduit 110). In such instances, the computing system 132 may leave the first downstream valve 120 at its opened to position to continue purging the first nozzle 38A. Additionally, in such instances, the computing system 132 may continue monitor the second air pressure (e.g., at (220)), determine the differential (e.g., at (222)), and compare the differential to the differential threshold (e.g., at (224)).

Conversely, when the determined differential exceeds the differential threshold, the control logic 200 includes, at (226), controlling the operation of the downstream valve such that the downstream valve is moved to the closed position to cease purging the agricultural fluid present within the nozzle. More specifically, when the determined differential exceeds the differential threshold, the first nozzle 38A and the first downstream fluid conduit 110 may be sufficiently free of residual agricultural fluid such that the purging of these components is complete. In such instances, the computing system 132 may control the operation of the first downstream valve 120 such that the first downstream valve 120 is moved to the closed position.

Additional nozzles may be purged in a similar manner. For example, in some embodiments, after closing the first downstream valve 120 at (226), the control logic 200 includes, at (228), controlling the operation of a second downstream valve such that the second downstream valve is moved to an opened position to purge the agricultural fluid present within the second nozzle. For example, after purging of the first nozzle 38A is complete and the first nozzle 38A is closed, the computing system 132 may control the operation of the second downstream valve 122 such that the second downstream valve 122 is moved to an opened position. For example, the computing system 132 may transmit control signals to the second downstream valve 122 via the communicative link 134 instructing the second downstream valve 122 to move to the opened position. Thereafter, the computing system 132 may monitor a third air pressure associated with the second nozzle 38B (e.g., based on data from the third pressure sensor 128), determine the differential between the first and third air pressures, and compare the determined differential to the differential threshold to determine when purging of the second nozzle 38B is complete. A third nozzle (not shown) may then be purged and so on.

The control logic 200, when executed by the computing system 100, may improve the effectiveness and efficiency of the purging operation for the sprayer 10. For example, using the differential between the first air pressure associated with the pressurized air source 104 and the second air pressure associated with the first nozzle 38A may allow the computing system to determine when purging of the first nozzle (or a first section of nozzles) is complete. Conventional purging systems control the duration of a purging operation based on a predetermined time period. However, the predetermined time period may elapse before or after the nozzle(s) has been fully purged. When the predetermined time period elapses before the nozzle(s) have been fully purged, agricultural fluid may remain within the nozzle(s), which can freeze or congeal. In addition, when the predetermined time period elapses after the nozzle(s) have been fully purged, purging air may be wasted and the purging process may take longer than is necessary. Thus, by using the determined differential, purging air can be supplied to a nozzle (or section of nozzles) across a duration that sufficiently removes the residual agricultural fluid without wasting purging air.

Figure 4:
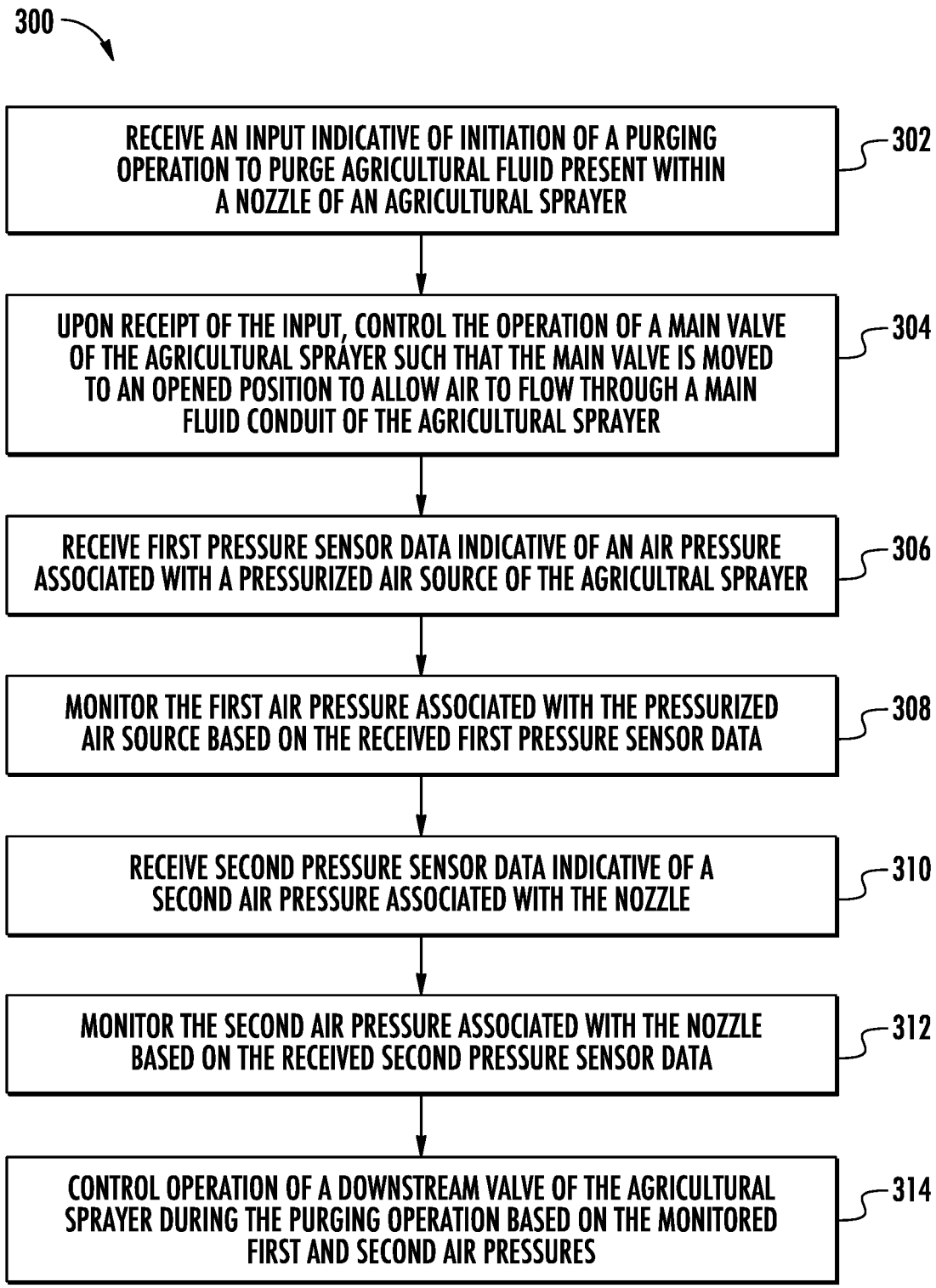
FIG. 4 illustrates a flow diagram of one embodiment of a method for purging nozzles of an agricultural sprayer in accordance with aspects of the present subject matter.

Referring now to FIG. 4, a flow diagram of one embodiment of a method 300 for purging nozzles of an agricultural sprayer is illustrated in accordance with aspects of the present subject matter. In general, the method 300 will be described herein with reference to the agricultural sprayer 10 and the system 100 described above with reference to FIGS. 1-3. However, it should be appreciated by those of ordinary skill in the art that the disclosed method 300 may generally be implemented with any agricultural sprayer having any suitable sprayer configuration and/or within any system having any suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (302), the method 300 may include receiving, with a computing system, an input indicative of initiation of a purging operation to purge the agricultural fluid present within first and second nozzles of an agricultural sprayer. For instance, as described above, the computing system 132 may receive an input (e.g., from an operator of the sprayer 10 via a user interface (not shown)) indicative of initiation of a purging operation to purge the agricultural fluid present within the first and second nozzles 38A, 38B of the sprayer 10.

Furthermore, upon receipt of the input, at (304), the method 300 may include controlling, with the computing system, the operation of the main valve such that the main valve is moved to an opened position to allow the air to flow through the main fluid conduit. For instance, as described above, upon receipt of the input, the computing system 132 may control the operation of the purge valve 118 such that the purge valve 118 is moved to an opened position to allow pressurized air from the purge tank 106 to flow through the main fluid conduit 108.

Additionally, as shown in FIG. 4, at (306), the method 300 may include receiving, with the computing system, first pressure sensor data indicative of an air pressure associated with a pressurized air source of the agricultural sprayer. For instance, as described above, the computing system 132 may receive first pressure sensor data indicative of the air pressure within the main fluid conduit 108 from the first pressure sensor 124 via the communicative link 134.

Moreover, at (308), the method 300 may include monitoring, with the computing system, the first air pressure associated with the pressurized air source based on the received first pressure sensor data. For instance, as described above, the computing system 132 may monitor the first air pressure within the main fluid conduit 108 based on the received first pressure sensor data.

In addition, as shown in FIG. 4, at (310), the method 300 may include receiving, with the computing system, second pressure sensor data indicative of an air pressure associated with the nozzle. For instance, as described above, the computing system 132 may receive second pressure sensor data indicative of the air pressure within the first downstream fluid conduit 110 from the second pressure sensor 126 via the communicative link 134.

Furthermore, at (312), the method 300 may include monitoring, with the computing system, the second air pressure associated with the nozzle based on the received second pressure sensor data. For instance, as described above, the computing system 132 may monitor the second air pressure within the first downstream fluid conduit 110 based on the received second pressure sensor data.

Additionally, as shown in FIG. 4, at (314), the method 300 may include controlling, with the computing system, the operation of a downstream valve of the agricultural sprayer during the purging operation based on the monitored first and second air pressures. For instance, as described above, the computing system 132 may control the operation of the first downstream valve 120 of the agricultural sprayer 10 during the purging operation based on the monitored first and second air pressures.

It is to be understood that the steps of the control logic 200 and the method 300 are performed by the computing system 132 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 132 described herein, such as the control logic 200 and the method 300, is implemented in software code or instructions which are tangibly stored on a tangible computer readable medium. The computing system 132 loads the software code or instructions via a direct interface with the computer readable medium or via a wired and/or wireless network. Upon loading and executing such software code or instructions by the computing system 132, the computing system 132 may perform any of the functionality of the computing system 132 described herein, including any steps of the control logic 200 and the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An agricultural sprayer, comprising:
    a purge tank;
    a main fluid conduit fluidly coupled to the purge tank;
    a main valve configured to selectively permit air from the purge tank to flow through the main fluid conduit;
    a boom assembly;
    a nozzle supported on the boom assembly, the nozzle configured to dispense an agricultural fluid onto an underlying field;
    a downstream fluid conduit fluidly coupled to the nozzle;
    a downstream valve fluidly coupled between the main fluid conduit and the downstream fluid conduit, the downstream valve configured to selectively permit the air from the main fluid conduit to flow to the nozzle;
    a first pressure sensor configured to capture data indicative of a first air pressure associated with the purge tank;
    a second pressure sensor configured to capture data indicative of a second air pressure associated with the nozzle; and
    a computing system communicatively coupled to the first and second pressure sensors, the computing system configured to:
        receive an input indicative of initiation of a purging operation to purge the agricultural fluid present within the nozzle;
        initiate a purging operation to purge the agricultural fluid present within the nozzle;
        upon receipt of the input, control an operation of the main valve such that the main valve is moved to an opened position to allow the air to flow through the main fluid conduit;
        upon receipt of the input, control the operation of the downstream valve such that the downstream valve is moved to an opened position to purge the agricultural fluid present within the nozzle;
        monitor the first air pressure associated with the purge tank based on the data captured by the first pressure sensor;
        monitor the second air pressure associated with the nozzle based on the data captured by the second pressure sensor;
        control an operation of the downstream valve during the purging operation based on the monitored first and second air pressures; and
        when controlling the operation of the downstream valve, determine a differential between the monitored first and second air pressures.

2. The agricultural sprayer of claim 1, wherein, when controlling the operation of the downstream valve, the computing system is further configured to:
    compare the determined differential to a differential threshold; and
    when the differential exceeds the differential threshold, control the operation of the downstream valve such that the downstream valve is moved to a closed position to cease purging the agricultural fluid present within the nozzle.

3. The agricultural sprayer of claim 1, wherein the second air pressure associated with the nozzle corresponds to an air pressure within the downstream fluid conduit.

4. The agricultural sprayer of claim 1, further comprising:
    an engine speed sensor configured to capture data indicative of an engine speed of the agricultural sprayer, the engine speed sensor being communicatively coupled to the computing system, wherein the computing system is further configured to:
    determine the engine speed of the agricultural sprayer based on the data captured by the engine speed sensor; and
    when the engine speed falls below a minimum engine speed threshold, halt the purging operation.

5. The agricultural sprayer of claim 1, wherein the nozzle corresponds to a first nozzle and the downstream valve corresponds to a first downstream valve, the agricultural sprayer further comprising:
    a second nozzle configured to dispense the agricultural fluid onto the underlying field;
    a second downstream fluid conduit fluidly coupled to the second nozzle; and
    a second downstream valve fluidly coupled between the main fluid conduit and the second downstream fluid conduit, the second downstream valve configured to selectively permit the air from the main fluid conduit to flow to the second nozzle; and
    a rinse tank configured to store a liquid for rinsing the first and second nozzles.

6. The agricultural sprayer of claim 4, further comprising:
    an agricultural fluid tank configured to store the agricultural fluid.

7. A system for purging nozzles of an agricultural sprayer, the system comprising:
- a pressurized air source;
- a main fluid conduit fluidly coupled to the pressurized air source;
- a main valve configured to selectively permit air from the pressurized air source to flow through the main fluid conduit;
- a nozzle configured to dispense an agricultural fluid onto an underlying field;
- a downstream fluid conduit fluidly coupled to the nozzle;
- a downstream valve fluidly coupled between the main fluid conduit and the downstream fluid conduit, the downstream valve configured to selectively permit air from the main fluid conduit to flow to the nozzle;
- a first pressure sensor configured to capture data indicative of a first air pressure associated with the pressurized air source;
- a second pressure sensor configured to capture data indicative of a second air pressure associated with the nozzle; and
- a computing system communicatively coupled to the first and second pressure sensors, the computing system configured to:
  - receive an input indicative of initiation of a purging operation to purge the agricultural fluid present within the nozzle;
  - upon receipt of the input, control an operation of the main valve such that the main valve is moved to an opened position to allow the air to flow through the main fluid conduit;
  - upon receipt of the input, control the operation of the downstream valve such that the downstream valve is moved to an opened position to purge the agricultural fluid present within the nozzle;
  - monitor the first air pressure associated with the pressurized air source based on the data captured by the first pressure sensor;
  - monitor the second air pressure associated with based on the data captured by the second pressure sensor;
  - control an operation of the downstream valve during the purging operation based on the monitored first and second air pressures; and
  - when controlling the operation of the downstream valve, determine a differential between the monitored first and second air pressures.

8. The system of claim 7 wherein, when controlling the operation of the downstream valve, the computing system is further configured to:
- compare the determined differential to a differential threshold; and
- when the differential exceeds the differential threshold, control the operation of the downstream valve such that the downstream valve is moved to a closed position to cease purging the agricultural fluid present within the nozzle.

9. The system of claim 8, wherein the nozzle corresponds to a first nozzle and the downstream valve corresponds to a first downstream valve, the system further comprising:
- a second nozzle configured to dispense the agricultural fluid onto the underlying field;
- a second downstream fluid conduit fluidly coupled to the second nozzle; and
- a second downstream valve fluidly coupled between the main fluid conduit and the second downstream fluid conduit, the second downstream valve configured to selectively permit the air from the main fluid conduit to flow to the second nozzle, the computing system being further configured to:
  - after first downstream valve is moved to the closed position to cease purging the agricultural fluid present within the first nozzle, control an operation of the second downstream valve such that the second downstream valve is moved to an opened position to purge the agricultural fluid present within the second nozzle.

10. The system of claim 7, further comprising:
- an engine speed sensor configured to capture data indicative of an engine speed of the agricultural sprayer, the engine speed sensor being communicatively coupled to the computing system, wherein the computing system is further configured to:
  - determine engine speed of the agricultural sprayer based on the data captured by the engine speed sensor; and
  - when the engine speed falls below a minimum engine speed threshold, halt the purging operation.

11. A method for purging nozzles of an agricultural sprayer, the agricultural sprayer including a pressurized air source, a main valve configured to selectively permit air from the pressurized air source to flow through a main fluid conduit, and a nozzle configured to dispense an agricultural fluid onto an underlying field, the agricultural sprayer further including a downstream valve configured to selectively permit air from the main fluid conduit to flow to the nozzle, the method comprising:
- receiving, with a computing system, an input indicative of initiation of a purging operation to purge the agricultural fluid present within the nozzle;
- upon receipt of the input, controlling, with the computing system, an operation of the main valve such that the main valve is moved to an opened position to allow the air to flow through the main fluid conduit;
- upon receipt of the input, controlling, with the computing system, the operation of the downstream valve such that the downstream valve is moved to an opened position to purge the agricultural fluid present within the nozzle;
- receiving, with the computing system, first pressure sensor data indicative of a first air pressure associated with the pressurized air source;
- monitoring, with the computing system, the first air pressure associated with the pressurized air source based on the received first pressure sensor data;
- receiving, with the computing system, second pressure sensor data indicative of a second air pressure associated with the nozzle;
- monitoring, with the computing system, the second air pressure associated with based on the received second pressure sensor data;
- controlling, with the computing system, an operation of the downstream valve during the purging operation based on the monitored first and second air pressures; and
- when controlling the operation of the downstream valve, determine a differential between the monitored first and second air pressures.

12. The method of claim 11, wherein controlling the operation of the downstream valve further comprises:
- comparing, with the computing system, the determined differential to a differential threshold; and
- when the differential exceeds the differential threshold, controlling, with the computing system, the operation of the downstream valve such that the downstream valve is moved to a closed position to cease purging the agricultural fluid present within the nozzle.

13. The method of claim 12, wherein the nozzle corresponds to a first nozzle and the downstream valve corresponds to a first downstream valve, the agricultural sprayer further including a second nozzle configured to dispense the agricultural fluid onto the underlying field and a second downstream valve configured to selectively permit the air from the main fluid conduit to flow to the second nozzle, the method further comprising:

after first downstream valve is moved to the closed position to cease purging the agricultural fluid present within the first nozzle, controlling, with the computing system, an operation of the second downstream valve such that the second downstream valve is moved to an opened position to purge the agricultural fluid present within the second nozzle.

14. The method of claim 11, further comprising:

receiving, with the computing system, engine speed sensor data indicative of an engine speed of the agricultural sprayer;

determining, with the computing system, the engine speed of the agricultural sprayer based on the received engine speed data; and when the engine speed falls below a minimum engine speed threshold, halting, with the computing system, the purging operation.

\* \* \* \* \*